(12) United States Patent
Xiao et al.

(10) Patent No.: US 9,898,989 B2
(45) Date of Patent: Feb. 20, 2018

(54) GATE DRIVER ON ARRAY (GOA) CIRCUIT AND LIQUID CRYSTAL DISPLAY APPARATUS HAVING THE GOA CIRCUIT

(71) Applicant: Wuhan China Star Optoelectronics Technology Co., Ltd., Wuhan, Hubei (CN)

(72) Inventors: Juncheng Xiao, Guangdong (CN); Yao Yan, Guangdong (CN); Ronglei Dai, Guangdong (CN); Shangcao Cao, Guangdong (CN)

(73) Assignee: WUHAN CHINA STAR OPTOELECTRONICS TECHNOLOGY CO., LTD, Wuhan, Hubei (CN)

( * ) Notice: Subject to any disclaimer, the term of this patent is extended or adjusted under 35 U.S.C. 154(b) by 172 days.

(21) Appl. No.: 15/011,502

(22) Filed: Jan. 30, 2016

(65) Prior Publication Data
US 2017/0124975 A1   May 4, 2017

(30) Foreign Application Priority Data
Oct. 29, 2015   (CN) .......................... 2015 1 0719419

(51) Int. Cl.
*G09G 3/36* (2006.01)
*G06F 3/041* (2006.01)

(52) U.S. Cl.
CPC ......... *G09G 3/3677* (2013.01); *G06F 3/0412* (2013.01); *G06F 3/0416* (2013.01); *G09G 2300/0408* (2013.01); *G09G 2310/0202* (2013.01); *G09G 2310/0286* (2013.01)

(58) Field of Classification Search
None
See application file for complete search history.

(56) References Cited

U.S. PATENT DOCUMENTS

| | | | |
|---|---|---|---|
| 2007/0200833 A1 | 8/2007 | Park et al. | |
| 2010/0158187 A1* | 6/2010 | Moon | G09G 3/3266 377/76 |
| 2013/0335367 A1* | 12/2013 | Kim | G09G 3/3696 345/174 |
| 2016/0125954 A1* | 5/2016 | Gu | G11C 19/28 377/64 |

FOREIGN PATENT DOCUMENTS

| | | |
|---|---|---|
| CN | 104750421 A | 7/2015 |
| CN | 104992684 A | 10/2015 |
| CN | 205122157 U | 3/2016 |
| JP | 2005309360 A | 11/2005 |

\* cited by examiner

*Primary Examiner* — Chad Dicke
(74) *Attorney, Agent, or Firm* — Andrew C. Cheng

(57) ABSTRACT

The disclosure discloses a GOA circuit and a liquid crystal display apparatus. The GOA circuit includes a number of GOA unit in cascade connection, wherein the Nth level GOA unit includes a common signal point control module, a gate signal point control module, and a GAS signal operation module; wherein the common signal point control module is used to pull up the electrical level of the common signal point after the period of all gate on; a gate signal point control module is used to pull down the electrical level of a gate signal point after the period of all gate on; the GAS signal operation module is used to achieve the all gate on function by a first GAS signal and a second GAS signal to control the output of the Nth level gate driving signal in the touch panel scanning period.

9 Claims, 5 Drawing Sheets

GATE DRIVER ON ARRAY (GOA) CIRCUIT AND LIQUID CRYSTAL DISPLAY APPARATUS HAVING THE GOA CIRCUIT

FIELD OF THE INVENTION

The present disclosure relates to the field of liquid crystal display apparatus technology, and in particular to a GOA circuit structure and a liquid crystal display apparatus.

BACKGROUND OF THE INVENTION

A gate driver on array (GOA) is a technology to form a gate line scanning driving signal circuit on the array substrate by the conventional process of the thin-film transistor crystal display to achieve the technology of driving method of scanning gate line by line.

With the rapid development of the smart phone, the touch panel (TP) technology, especially the In Cell Touch Panel technology is further developed. Wherein the in cell touch panel is meant to form partial of the touch pad of the in cell touch panel on the array substrate by using the array process of the thin film transistor liquid crystal display apparatus to achieve the touch function.

The conventional GOA circuit with the In Cell Touch Panel technology will have the function failure risk of the GOA circuit when operating All Gate On function. For example, the leakage of a gate signal point when all gate on and make the electric potential of the gate signal point in the abnormal status and lead to the failure of the GOA circuit. Besides, during the scanning period of the touch panel, a scanning signal is raised on the touch pad; the scanning signal will influence a gate driving signal of the GOA circuit and influence the normal display of the liquid crystal display apparatus.

Wherein, the all gate on function is to set all of the gate driving signal in a valid electrical level to scan all of the liquid crystal display apparatus in the GOA circuit to clear the remaining charge of each pixel of the liquid crystal display apparatus from the black screen stage into the black screen awakening stage to solve the shadow issue when opening the panel.

SUMMARY OF THE INVENTION

AGOA circuit and a liquid crystal display apparatus are provided in this disclosure to decrease the risk of the failure of the GOA circuit after the all gate on stage and to eliminate the influence of a scanning signal to a gate driving signal of the GOA circuit to ensure the normal operation of the GOA circuit.

In order to solve the technical problem, the technical feature adapted in this disclosure is as followed: a GOA circuit for liquid crystal display apparatus is provided for using in the liquid crystal display apparatus, the GOA circuit having a plurality of GOA unit in cascade connection, wherein a Nth level GOA unit including: a forward and reverse scanning module, an output control module, a pull-down module, a common signal point control module, a gate signal point control module, and an all-gate-on (GAS) signal operation module; wherein the forward and reverse scanning module is used to control the forward scanning and the reverse scanning of the GOA circuit by the using of a first driving signal and a second driving signal; the output control module is used to control the output of a Nth level gate driving signal during the operating period of the Nth level GOA unit; the pull-down module is used to pull down the electrical level of the Nth level gate driving signal in the non-operating period of the Nth level GOA unit and control the output of the Nth level gate driving signal during the touch panel scanning period; the common signal point control module is used to pull down the electrical level of a common signal point during the period of all gate on, to pull up the electrical level of the common signal point during the period of entering black screen awakening stage and control the electrical level of the common signal point during the operating period of the Nth level GOA unit; the gate signal point control module is used to control the electrical level of the gate signal point during the operating period of the Nth level GOA unit, and pull down the electrical level of the gate signal point during the period of entering black screen awakening stage; and the GAS signal operation module is used to achieve the all gate on function by a first GAS signal and a second GAS signal and control the output of the Nth level gate driving signal in the touch panel scanning period.

Wherein the forward and reverse scanning module including a first transistor, and a second transistor; a gate of the first transistor is connected to the N-2th level gate driving signal, a drain of the first transistor is connected to the first driving signal, a source of the first transistor is connected to a gate signal point, a gate of the second transistor is connected to the N+2th level gate driving signal, a drain of the second transistor is connected to the second driving signal and a source of the second transistor is connected to the gate signal point; the output control module including a third transistor and a first capacitor, a gate of the third transistor is connected to one terminal of the first capacitor and the gate signal point, a source of the third transistor is connected to the other terminal of the first capacitor and the Nth level gate driving signal and a drain of the of the third transistor is connected to the first control clock; the pull-down module includes a fourth transistor, a gate of the fourth transistor is connected to the common signal point, a source of the fourth transistor is connected to the negative and constant potential signal, a drain of the fourth transistor is connected to the Nth level gate driving signal; the common signal point control module including a fifth transistor, a sixth transistor, a seventh transistor, and an eighth transistor, a gate and a drain of the fifth transistor are connected to a reset signal, a source of the fifth transistor is connected to the common signal point, a gate of the sixth transistor is connected to the gate signal point, a source of the sixth transistor is connected to the second control clock, a drain of the sixth transistor is connected to the common signal point, a gate of the seventh transistor is connected to the second control clock, a source of the seventh transistor is connected to the common signal point, a drain of the seventh transistor is connected to the positive and constant potential signal, a gate of the eighth transistor is connected to the first GAS signal, a source of the eighth transistor is connected to the negative and constant potential signal, a drain of the eighth transistor is connected to the common signal point; the gate signal point control module including a ninth transistor, a tenth transistor and an eleventh transistor, a gate of the ninth transistor is connected to the first control clock, a source of the ninth transistor is connected to a drain of the tenth transistor, a drain of the ninth transistor is connected to the gate signal point, a gate of the tenth transistor is connected to the common signal point, a source of the tenth transistor is connected to the negative and constant potential signal, a gate of the eleventh transistor is connected to the gate of the fifth transistor, a source of the eleventh transistor is connected to the negative and constant potential signal, a drain of the eleventh transistor is connected to the gate signal point; and the GAS signal operation module including a twelfth transistor, and a thirteenth transistor, a gate and a source of the twelfth transistor are connected and received the first GAS signal, a drain of the twelfth transistor is connected to the Nth level gate driving signal, a gate of the thirteenth transistor is received the second GAS signal, a source of the thirteenth transistor is connected to the negative and constant potential signal, a drain of the thirteenth transistor is connected to the Nth level gate driving signal. Wherein the circuit further including a first leakage control module to decrease the leakage of the gate signal point in the operating period of the Nth level GOA unit, wherein the first leakage control module including a fourteenth transistor, the fourteenth transistor is connected between the drain of the ninth transistor and the gate of the third transistor, a gate of the fourteenth transistor is connected to the positive and constant potential signal, a source of the fourteenth transistor is connected to the gate of the third transistor, a drain of the fourteenth transistor is connected to the drain of the ninth transistor.

Wherein the circuit further including a second leakage control module to control the leakage of the gate signal point in the operating period of the touch panel scanning period, wherein the second leakage control module including a fifteenth transistor and a sixteenth transistor, a gate of the fifteenth transistor is connected to the first driving signal, the gate of the sixteenth transistor is connected to the second driving signal, a source of the fifteenth transistor is connected to the source of the sixteenth transistor and further connected to the drain of the ninth transistor, a drain of the fifteenth transistor is connected to a drain of the sixteenth transistor and further connected to the source of the first transistor.

Wherein the circuit further including a common signal point assistant control module to assist the common signal point control module to control the electrical level of the common signal point in the operating period of the Nth level GOA unit; and wherein the common signal point assistant control module is connected between the second clock control signal and the source of the sixth transistor, the common signal point assistant control module includes a seventeenth transistor and an eighteenth transistor, a gate of the seventeenth transistor is connected to the first driving signal, a gate of the eighteenth transistor is connected to the second driving signal, a source of the seventeenth transistor and the eighteenth transistor are connected to the source of the sixth transistor, a drain of the seventeenth transistor and the eighteenth transistor are connected to the second control clock.

Wherein the GOA circuit receives a first clock signal, a second clock signal, a third clock signal, and a fourth clock signal, wherein the first clock signal, the second clock signal, the third clock signal, and the fourth clock signal are timely valid in an operating period of the GOA circuit; wherein the GOA circuit further including a first GOA sub circuit having odd number level GOA units in cascade connection, and a second GOA sub circuit having even number level GOA units in cascade connection; and Wherein in the first GOA sub circuit, the first clock signal and the third clock signal is interlace input to the first control clock and the second control clock;

Wherein in the second GOA sub circuit, the second clock signal and the fourth clock signal are interlace input to the first control clock and the second control clock of the GOA unit.

Wherein in the touch panel scanning stage, the first clock signal, the second clock signal, the third clock signal, the fourth clock signal and the negative and constant potential signal output a scanning pulse signal.

Wherein in the black screen stage, the first GAS signal is a high electrical level signal, and the second GAS signal is a low electrical level signal.

Wherein the black screen stage including a touch panel detection period and all gate on of all of a gate driving signal period, wherein in the touch panel detection period, the first GAS signal is low electrical level signal, the second GAS signal is high electrical level signal; in the all gate on stage, the first GAS signal is high electrical level signal, the second GAS signal is low electrical level signal.

In order to solve the technical problem mentioned above, another technical approach adopted in the disclosure is provided a liquid crystal display apparatus including a GOA circuit mentioned above.

The advantage of this disclosure is the GOA circuit and the liquid crystal display apparatus in this disclosure pull up the electrical level of the common signal point after the period of all gate on by the common signal point control module; the gate signal point control module is used to pull down the electrical level of the gate signal point after the period of all gate on to control the leakage of the gate signal point after the all gate on stage to decrease the risk of the failure of the GOA circuit and ensure the normal operation of the GOA circuit. Besides, the disclosure controls the output of the gate driving signal by the two GAS signals in the touch panel scanning stage to eliminate the influence of the scanning signal to the gate driving signal of the GOA circuit to ensure the normal operation of the GOA circuit.

BRIEF DESCRIPTION OF THE DRAWINGS

The following detailed descriptions accompanying drawings and the embodiment of the present disclosure make the aspect of the present disclosure and the other beneficial effect more obvious.

DETAILED DESCRIPTION OF THE PREFERRED EMBODIMENTS

The specific components or items are used in the specification and claims. Those skilled in the art can use other possible modifications and variations in the same components or items. The specification and claim will not distinguish the different terms to the items or components but by the functions. Following is the detail description illustrated by the figures and the embodiments.

Figure 1:
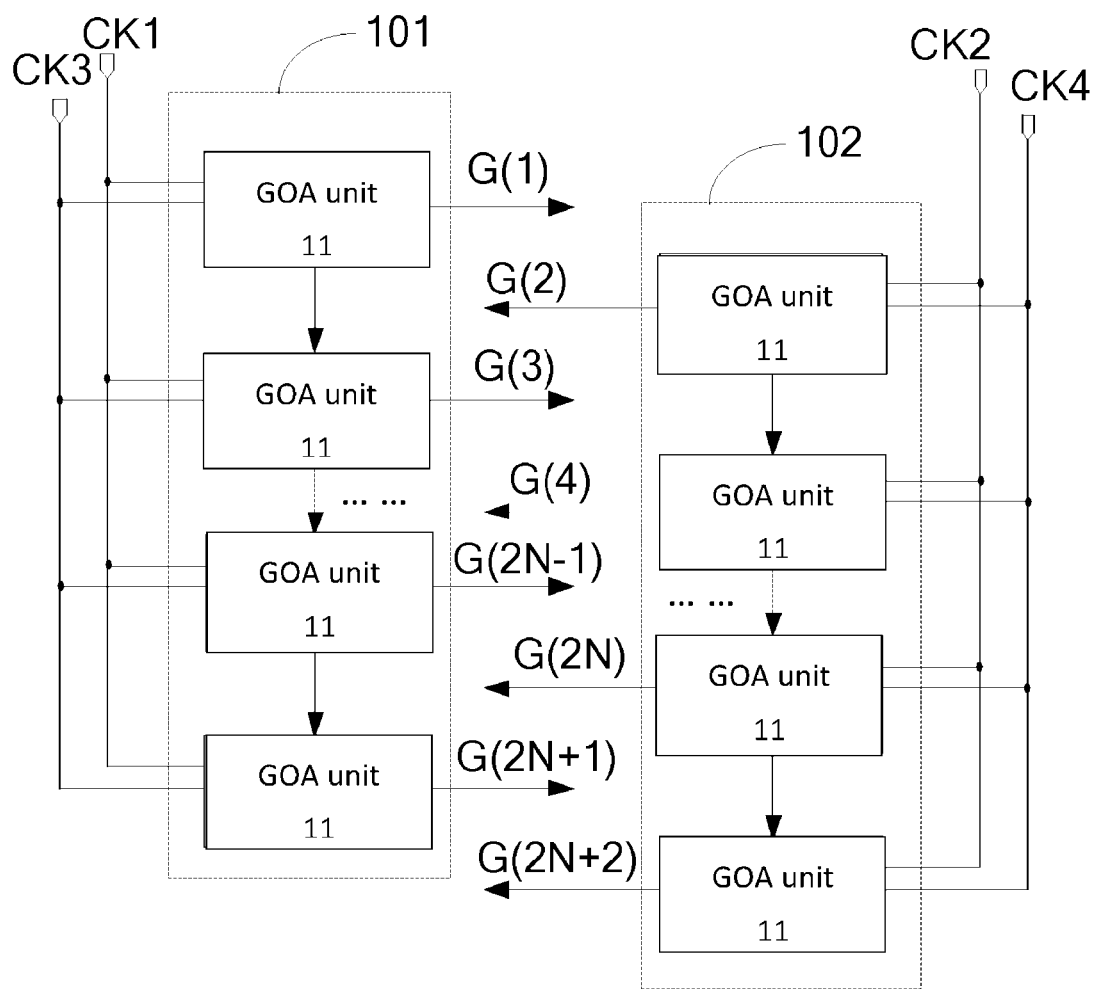
FIG. 1 is a schematic view illustrating the GOA circuit structure according to the present disclosure.

FIG. 1 is a schematic view illustrating the GOA circuit structure according to the present disclosure. As illustrated in FIG. 1, a plurality of the GOA unit 11 is in cascade connection of a GOA circuit 10, wherein a Nth level GOA unit 11 is used to output a gate driving signal G(N) to charge a Nth level horizontal scanning line corresponding to the display zone to achieve the normal display of the liquid crystal display apparatus.

Specifically, the GOA circuit 10 includes a first GOA sub circuit 101 having odd number level GOA units in cascade connection, and a second GOA sub circuit 102 having even number level GOA units in cascade connection. The interlace driving is used in the GOA circuit 10, a gate driving signals are output form the first GOA sub circuit 101 and the second GOA sub circuit 102 alternately.

The GOA circuit 10 receives a first clock signal CK1, a second clock signal CK2, a third clock signal CK3, and a fourth clock signal CK4, wherein the first clock signal CK1, the second clock signal CK2, the third clock signal CK3, and the fourth clock signal CK4 are timely valid in an operating period of the GOA circuit 10. Wherein the first GOA sub circuit 101 receives the first clock signal CK1 and the third clock signal CK3, the second GOA sub circuit 102 receives the second clock signal CK2 and the fourth clock signal CK4.

Figure 2:
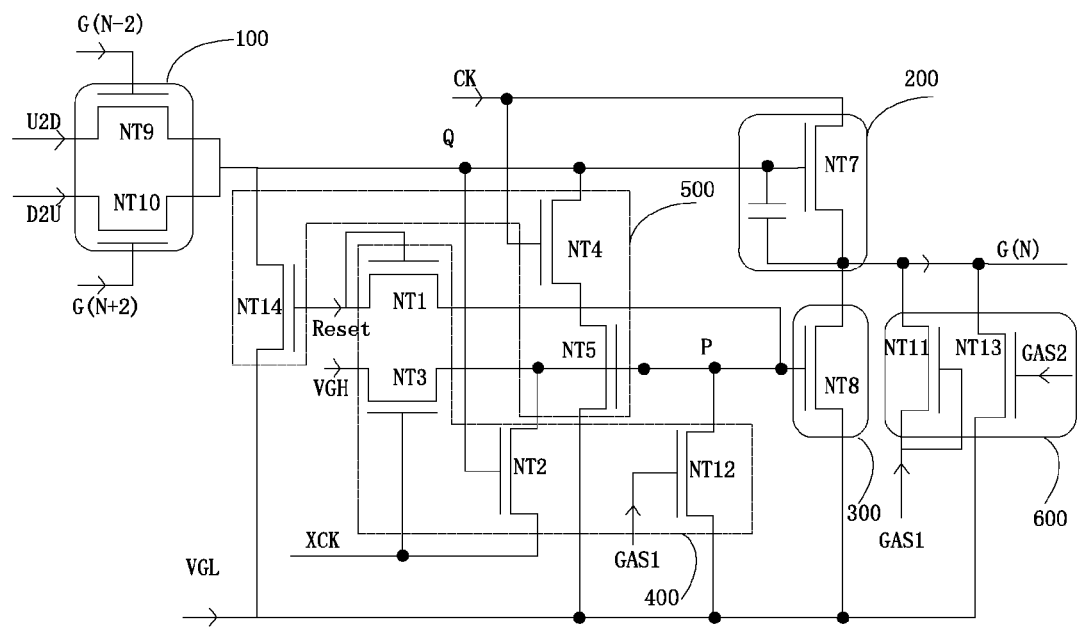
FIG. 2 is circuit diagram of FIG. 1 illustrates a GOA unit of the GOA circuit structure according to the first embodiment of the present disclosure.

FIG. 2 is circuit diagram of FIG. 1 illustrates a GOA unit of the GOA circuit structure according to the first embodiment of the present disclosure. As illustrated in FIG. 2, the Nth level GOA unit 11 includes a forward and reverse scanning module 100, an output control module 200, a pull-down module 300, a common signal point control module 400, a gate signal point control module 500, and a GAS signal operation module 600.

Wherein the forward and reverse scanning module 100 is used to control the forward scanning and the reverse scanning of the GOA circuit by the using of a first driving signal U2D and a second driving signal D2U. The output control module 200 is used to control the output of a Nth level gate driving signal G(N) during the operating period of a Nth level GOA unit. The pull-down module 300 is used to pull down the electrical level of the Nth level gate driving signal G(N) and control the output of the Nth level gate driving signal G(N) during the touch panel scanning period in the non-operating period of the Nth level GOA unit. The common signal point control module 400 is used to pull down the electrical level of a common signal point P during the period of all gate on, to pull up the electrical level of the common signal point P during the period of entering black screen awakening stage and control the electrical level of the common signal point P during the operating period of the Nth level GOA unit. A gate signal point control module 500 is used to control the electrical level of a gate signal point Q during the operating period of the Nth level GOA unit, and pull down the electrical level of the gate signal point Q during the period of entering black screen awakening stage. The GAS signal operation module 600 is used to achieve the all gate on function by a first GAS signal Gas1 and a second GAS signal Gas2 and control the output of the Nth level gate driving signal G(N) in the touch panel scanning period. Wherein the operating period of the GOA unit is the period of the Nth level GOA unit output a normal gate driving signal G(N) to make the normal display of the liquid crystal display apparatus, such as the display period in the following timing diagram of FIG. 3 and FIG. 5.

Specifically, the forward and reverse scanning module 100 includes a transistor NT9, and a transistor NT10. A gate of the transistor NT9 is connected to aN-2th level gate driving signal G (N−2), a drain of the transistor NT9 is connected to the first driving signal U2D, a source of the transistor NT9 is connected to the gate signal point Q, a gate of the transistor NT10 is connected to aN+2th level gate driving signal G(N+2), a drain of the transistor NT10 is connected to the second driving signal D2U and a source of the transistor NT10 is connected to the gate signal point Q.

The output control module 200 includes a transistor NT7 and a first capacitor C1, a gate of the transistor NT7 is connected to one terminal of the first capacitor C1 and the gate signal point Q a source of the transistor NT7 is connected to the other terminal of the first capacitor C1 and the Nth level gate driving signal G(N) and a drain of the of the transistor NT7 is connected to a first control clock CK, wherein the first capacitor C1 is used to raise the electric potential of the gate signal point Q.

The pull-down module 300 includes a transistor NT8, a gate of the transistor NT8 is connected to the common signal point P, a source of the transistor NT8 is connected to a negative and constant potential signal VGL, a drain of the transistor NT8 is connected to the Nth level gate driving signal G(N).

The common signal point control module 400 includes a transistor NT1, a transistor NT2, a transistor NT3, and a transistor NT12. A gate and a drain of the transistor NT1 are connected to a reset signal Reset, a source of the transistor NT1 is connected to the common signal point P, a gate of the transistor NT2 is connected to the gate signal point Q, a source of the transistor NT2 is connected to a second control clock XCK, a drain of the transistor NT2 is connected to the common signal point P, a gate of the transistor NT3 is connected to the second control clock XCK, a source of the transistor NT3 is connected to the common signal point P, a drain of the transistor NT3 is connected to a positive and constant potential signal VGH, a gate of the transistor NT12 is connected to the first GAS signal GAS1, a source of the transistor NT12 is connected to the negative and constant potential signal VGL, a drain of the transistor NT12 is connected to the common signal point P.

The gate signal point control module 500 includes a transistor NT4, a transistor NT5 and a transistor NT14, a gate of the transistor NT4 is connected to the first control clock CK, a source of the transistor NT4 is connected to a drain of the tenth transistor T5, a drain of the transistor NT4 is connected to the gate signal point Q, a gate of the tenth transistor T5 is connected to the common signal point P, a source of the transistor NT5 is connected to the negative and constant potential signal VGL, a gate of the transistor NT14 is connected to the gate of the transistor NT1, a source of the transistor NT14 is connected to the negative and constant potential signal VGL, a drain of the transistor NT14 is connected to the gate signal point Q. The GAS signal operation module 600 includes a transistor NT11, and a transistor NT13. A gate and a source of the transistor NT11 are connected and received the first GAS signal GAS1, a drain of the transistor NT11 is connected to the Nth level gate driving signal G(N), a gate of the transistor NT13 is received the second GAS signal GAS2, a source of the transistor NT13 is connected to the negative and constant potential signal VGL, a drain of the transistor NT13 is connected to the Nth level gate driving signal G(N).

Wherein when the Nth level GOA unit 11 is a GOA unit in the first GOA sub circuit 101, the first clock signal CK1 and the third clock signal CK3 is interlace input to the first control clock CK and a second control clock XCK of the GOA unit. When the Nth level GOA unit is a GOA unit in the second GOA sub circuit 102, the second clock signal CK2 and the fourth clock signal CK4 is interlace input to the first control clock CK and the second control clock XCK of the GOA unit. The person skilled in the art can be understood that the transistors in the GOA unit are taken a NMOS transistor as an example to illustrated. In other examples, the transistors in the GOA unit can be a PMOS transistor.

Figure 3:
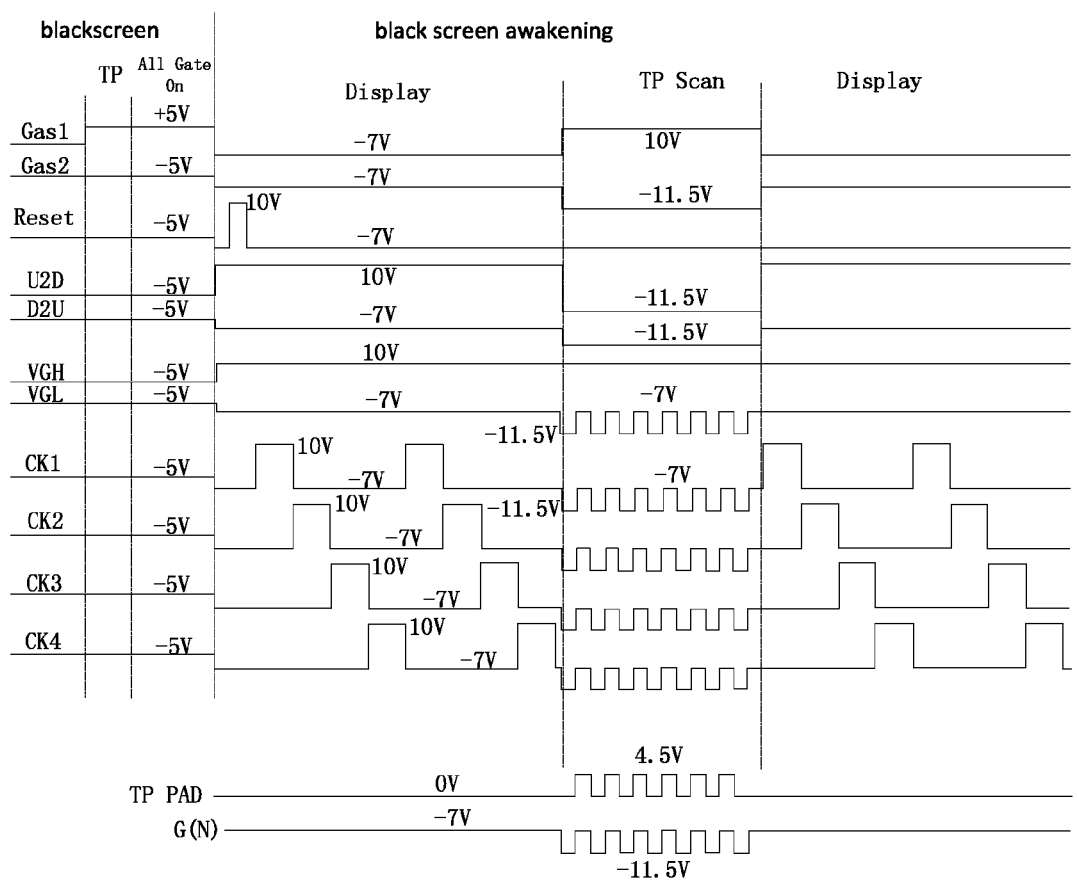
FIG. 3 is a timing diagram of the GOA unit of the GOA circuit structure according to the first embodiment of the present disclosure.

Referring to FIG. 3, FIG. 3 is a timing diagram of the GOA unit of the GOA circuit illustrated in FIG. 2. As illustrated in FIG. 3, the operating period of the GOA unit includes a black screen stage into the black screen awakening stage wherein the black screen includes touch panel detection period TP and all gate on of all of the gate driving signal period. The black screen awakening stage includes a normal display stage and a touch panel scan stage.

In the black screen stage, the first GAS signal Gas1 is a high electrical level signal, the electric potential of the high electrical level signal is +5V, the second GAS signal Gas2 is a low electrical level signal, and the electric potential of the low electrical level signal is −5V. Wherein in the all gate on stage, the first GAS signal Gas1 controls the transistor NT11 to achieve the on function of all of the gate driving signal. In the meantime, the first GAS signal Gas1 controls the transistor 12 and achieve the pull down of the common signal point P, close the pull down channel and better achieve the on function of all of a gate driving signal.

Figure 4:
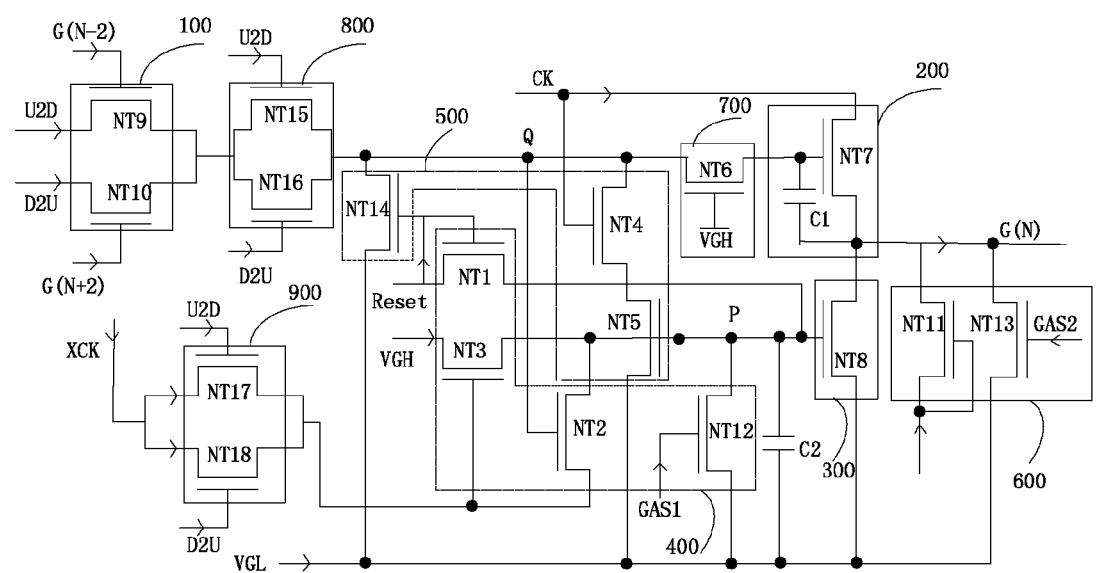
FIG. 4 is circuit diagram of FIG. 1 illustrates a GOA unit of the GOA circuit structure according to the second embodiment of the present disclosure.

In the black screen awakening stage, in the display stage, first, the reset signal Reset controls the transistor 11 to ensure the initial potential of a common signal point P is in a high electrical potential, and ensure the output point of the gate signal point Q is in a normal electrical potential, and decrease the leakage of the gate signal point Q. Following, the first clock signal CK1, the second clock signal CK2, the third clock signal CK3 and the fourth clock signal CK4 is timely valid accordingly to control the GOA unit and output the scanning signal G(N) to charge a Nth horizontal scanning line corresponding to the display zone to achieve the normal display of the liquid crystal display apparatus. Followed, in the TP scan stage, the first GAS signal Gas1 is a high electrical level signal, the electric potential of the high electrical level signal is +10V, the second GAS signal Gas2 is a low electrical level signal, the electric potential of the high electrical level signal is −11.5V. The first clock signal CK1, the second clock signal CK2, the third clock signal CK3, the fourth clock signal CK4 and the negative and constant potential signal VGL output a scanning pulse signal, and a scanning pulse signal is output form the Nth level gate driving signal G(N) in the TP scan stage and eliminate the influence of the scanning signal TP PAD of the touch panel in the TP scan period to the normal output of the gate driving signal G(N) and eliminate the influence to the normal display of the liquid crystal display apparatus. FIG. 4 is circuit diagram of FIG. 1 illustrates a GOA unit of the GOA circuit structure according to the second embodiment of the present disclosure. The difference of the second embodiment illustrated in FIG. 4 and the first embodiment illustrated in FIG. 2 is as followed. The second embodiment illustrated in FIG. 4 further includes a first leakage control module 700, a second leakage control module 800 and a common signal point assistant control module 900.

Wherein the first leakage control module 700 is used to control the leakage of the gate signal point Q in the operating period of the Nth level GOA unit. The second leakage control module 800 is used to control the leakage of the gate signal point Q in the operating period of the touch panel scanning period. The common signal point assistant control module 900 is used to assist the common signal point control module 400 to control the electrical level of the common signal point P in the operating period of the Nth level GOA unit.

Specifically, the first leakage control module 700 includes a transistor NT6, the transistor NT6 is connected between the drain of the transistor NT4 and the gate of the transistor NT7. A gate of the transistor NT6 is connected to the positive and constant potential signal VGH, a source of the transistor NT6 is connected to the gate of the transistor NT7. A drain of the transistor NT6 is connected to the drain of the transistor NT4. Wherein the first leakage control module 700 is used to control the leakage of the gate signal point Q through the transistor NT7 in the normal display period.

The second leakage control module 800 includes a transistor NT15 and a transistor NT16, a gate of the transistor NT15 is connected to the first driving signal U2D, a gate of the transistor NT16 is connected to the second driving signal D2U, a source of the transistor NT15 is connected to a source of the transistor NT16 and further connected to the drain of the transistor NT4, a drain of the transistor NT15 is connected to a drain of the transistor NT16 and further connected to the source of the transistor NT9 wherein the second leakage control module 800 ensure the stability of a gate signal Q in the touch panel scanning period and decrease the leakage of the gate signal Q.

The common signal point assistant control module 900 is connected between the second clock control signal XCK and the source of the transistor NT2. The common signal point assistant control module 900 includes a transistor NT17 and a transistor NT18, a gate of the transistor NT17 is connected to the first driving signal U2D, a gate of the transistor NT18 is connected to the second driving signal D2U, sources of the transistor NT17 and the transistor NT18 are connected to the source of the transistor NT2, drains of the transistor NT17 and the transistor NT18 are connected to the second control clock XCK. Wherein the common signal point assistant control module 900 achieve the function of better controlling the electrical level of the common signal point P by the alternation through the source and the drain of the transistor NT17 and the transistor NT18.

In a preferred embodiment, as the second embodiment illustrated in FIG. 4 further includes a second capacitor C2, the one terminal of the second capacitor C2 is connected to the common signal point P, the other terminal of the second capacitor C2 is connected to the negative and constant potential signal VGL.

Figure 5:
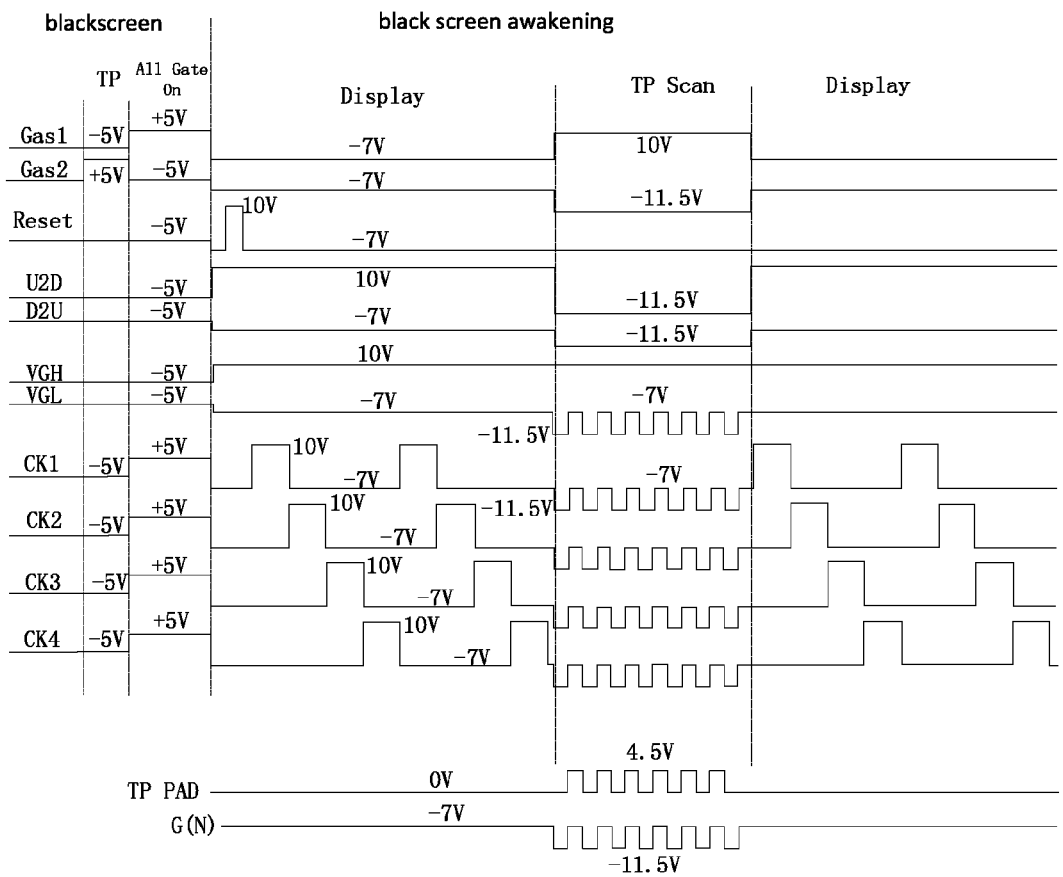
FIG. 5 is a timing diagram of the GOA unit of the GOA circuit structure according to the second embodiment of the present disclosure.
Figure 6:
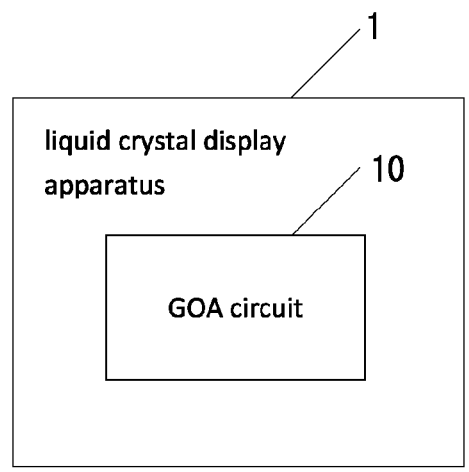
FIG. 6 is a schematic structural view of the liquid crystal display apparatus in the preferred embodiment.

Referring to FIG. 5, FIG. 5 is a timing diagram of the GOA unit illustrated in FIG. 4. The difference between the FIG. 3 and FIG. 5 is as followed. In the black screen stage, the timing diagram of the first GAS signal Gas 1 and the second GAS signal Gas2 in FIG. 4 is different from that in FIG. 5 and eliminate the unstable electrical potential after the all gate on function to output of the gate signal point Q in the black screen stage and eliminate the risk of the circuit failure. Specifically, in the touch detection stage such as the TP stage, the first GAS signal Gas 1 is a low electrical level signal, the second GAS signal Gas 2 is a high electrical level signal. In the stage of all of the gate signal open such as the all gate on stage, the first GAS signal Gas 1 is a high electrical level signal, the second GAS signal Gas 2 is a low electrical level signal, wherein the electrical potential of the high electrical level is +5V, and the low electrical level is −5V. FIG. 6 is a schematic structural view of the liquid crystal display apparatus in the preferred embodiment. As illustrated in FIG. 6, the liquid crystal display apparatus 1 includes the GOA circuit 10 mentioned above.

The advantage of this disclosure is: the GOA circuit and the liquid crystal display apparatus of the present disclosure pull up the electrical level of the common signal point by the common signal point control module after the all gate on stage and pull down the electrical level of the gate signal point by the gate signal point control module after the all gate on stage to control the leakage of the gate signal point after the all gate on stage to decrease the risk of the failure of the GOA circuit. In the meantime, the disclosure controls the output of the gate driving signal by the two GAS signals in the touch panel scanning stage to eliminate the influence of the scanning signal to the gate driving signal of the GOA circuit to ensure the normal operation of the GOA circuit.

It will be apparent to those having ordinary skill in the art that various modifications and variations can be made to the devices in accordance with the present disclosure without departing from the scope or spirit of the disclosure. In view of the foregoing, it is intended that the present disclosure covers modifications and variations of this disclosure provided they fall within the scope of the following claims and their equivalents.

Although the drawings and the illustrations above are corresponding to the specific embodiments individually, the element, the practicing method, the designing principle, and the technical theory can be referred, exchanged, incorporated, collocated, coordinated except they are conflicted, incompatible, or hard to be put into practice together.

Although the present disclosure has been explained above, it is not the limitation of the range, the sequence in practice, the material in practice, or the method in practice. Any modification or decoration for present disclosure is not detached from the spirit and the range of such.

What is claimed is:

1. A gate driver on array (GOA) circuit for liquid crystal display apparatus, the GOA circuit having a plurality of GOA unit in cascade connection, wherein the Nth level GOA unit comprising:
   a forward and reverse scanning module, an output control module, a pull-down module, a common signal point control module, a gate signal point control module, and an all-gate-on (GAS) signal operation module;
   wherein the forward and reverse scanning module is used to control the forward scanning and the reverse scanning of the GOA circuit by the using of the first driving signal and the second driving signal;
   the output control module is used to control the output of the Nth level gate driving signal during the operating period of the Nth level GOA unit;
   the pull-down module is used to pull down the electrical level of a Nth level gate driving signal in the non-operating period of the Nth level GOA unit and control the output of the Nth level gate driving signal during the touch panel scanning period;
   the common signal point control module is used to pull down the electrical level of a common signal point during the period of all gate on function of a gate driving signal, to pull up the electrical level of the common signal point during the period of entering black screen awakening stage and control the electrical level of the common signal point during the operating period of the Nth level GOA unit;
   the gate signal point control module is used to control the electrical level of a gate signal point during the operating period of the Nth level GOA unit, and pull down the electrical level of the gate signal point during the period of entering black screen awakening stage;
   the GAS signal operation module is used to achieve the all gate on function of the gate driving signal by a first GAS signal and a second GAS signal and control the output of the Nth level gate driving signal in the touch panel scanning period;
   the forward and reverse scanning module comprises a first transistor, and a second transistor; a gate of the first transistor is connected to the N-2th level gate driving signal, a drain of the first transistor is connected to the first driving signal, a source of the first transistor is connected to the gate signal point, a gate of the second transistor is connected to the N+2th level gate driving signal, a drain of the second transistor is connected to the second driving signal and a source of the second transistor is connected to the gate signal point;
   the output control module comprising a third transistor and a first capacitor, a gate of the third transistor is connected to one terminal of the first capacitor and the gate signal point, a source of the third transistor is connected to the other terminal of the first capacitor and the Nth level gate driving signal and a drain of the of the third transistor is connected to a first control clock;
   the pull-down module includes a fourth transistor, a gate of the fourth transistor is connected to the common signal point, a source of the fourth transistor is connected to the negative and constant potential signal, a drain of the fourth transistor is connected to the Nth level gate driving signal;
   the common signal point control module comprising a fifth transistor, a sixth transistor, a seventh transistor, and an eighth transistor, a gate and a drain of the fifth transistor are connected to a reset signal, a source of the fifth transistor is connected to the common signal point, a gate of the sixth transistor is connected to the gate signal point, a source of the sixth transistor is connected to a second control clock, a drain of the sixth transistor is connected to the common signal point, a gate of the seventh transistor is connected to the second control clock, a source of the seventh transistor is connected to the common signal point, a drain of the seventh transistor is connected to the positive and constant potential signal, a gate of the eighth transistor is connected to the first GAS signal, a source of the eighth transistor is connected to the negative and constant potential signal, a drain of the eighth transistor is connected to the common signal point;
   the gate signal point control module comprises a ninth transistor, a tenth transistor and an eleventh transistor, a gate of the ninth transistor is connected to the first control clock, a source of the ninth transistor is connected to a drain of the tenth transistor, a drain of the ninth transistor is connected to the gate signal point, a gate of the tenth transistor is connected to the common signal point, a source of the tenth transistor is connected to the negative and constant potential signal, a gate of the eleventh transistor is connected to the gate of the fifth transistor, a source of the eleventh transistor is connected to the negative and constant potential signal, a drain of the eleventh transistor is connected to the gate signal point; and
   the GAS signal operation module comprises a twelfth transistor, and a thirteenth transistor, a gate and a source of the twelfth transistor are connected and received the first GAS signal, a drain of the twelfth transistor is connected to the Nth level gate driving signal, a gate of the thirteenth transistor is received the second GAS signal, a source of the thirteenth transistor is connected to the negative and constant potential signal, a drain of the thirteenth transistor is connected to the Nth level gate driving signal.

2. The GOA circuit according to claim 1, further comprising a first leakage control module to decrease the leakage of the gate signal point in the operating period of the Nth level GOA unit, wherein the first leakage control module comprises a fourteenth transistor, the fourteenth transistor is connected between the drain of the ninth transistor and the gate of the third transistor, a gate of the fourteenth transistor is connected to the positive and constant potential signal, a source of the fourteenth transistor is connected to the gate of the third transistor, a drain of the fourteenth transistor is connected to the drain of the ninth transistor.

3. The GOA circuit according to claim 1, further comprising a second leakage control module to control the leakage of the gate signal point in the operating period of the touch panel scanning period, wherein the second leakage control module comprises a fifteenth transistor and a sixteenth transistor, a gate of the fifteenth transistor is connected to the first driving signal, a gate of the sixteenth transistor is connected to the second driving signal, a source of the fifteenth transistor is connected to a source of the sixteenth transistor and further connected to the drain of the ninth transistor, a drain of the fifteenth transistor is connected to a drain of the sixteenth transistor and further connected to the source of the first transistor.

4. The GOA circuit according to claim 3, further comprising a common signal point assistant control module to assist the common signal point control module to control the electrical level of the common signal point in the operating period of the Nth level GOA unit; and wherein the common signal point assistant control module is connected between the second clock control signal and the source of the sixth transistor, the common signal point assistant control module comprises a seventeenth transistor and an eighteenth transistor, a gate of the seventeenth transistor is connected to the first driving signal, a gate of the eighteenth transistor is connected to the second driving signal, the source of the seventeenth transistor and the eighteenth transistor are connected to the source of the sixth transistor, the drain of the seventeenth transistor and the eighteenth transistor are connected to the second control clock.

5. The GOA circuit according to claim 1, wherein the GOA circuit receives a first clock signal, a second clock signal, a third clock signal, and a fourth clock signal, wherein the first clock signal, the second clock signal, the third clock signal, and the fourth clock signal are timely valid in the operating period of the GOA circuit;

wherein the GOA circuit further comprises a first GOA sub circuit having odd number level GOA units in cascade connection, and a second GOA sub circuit having even number level GOA units in cascade connection; and wherein in the first GOA sub circuit, the first clock signal and the third clock signal are interlaced input to the first control clock and the second control clock;

wherein in the second GOA sub circuit, the second clock signal and the fourth clock signal are interlaced input to the first control clock and the second control clock of the GOA unit.

6. The GOA circuit according to claim 5, wherein the first clock signal, the second clock signal, the third clock signal, the fourth clock signal and the negative and constant potential signal output a scanning pulse signal in the touch panel scanning stage.

7. The GOA circuit according to claim 1, wherein in the black screen stage of the liquid crystal display apparatus, the first GAS signal is a high electrical level signal, and the second GAS signal is a low electrical level signal.

8. The GOA circuit according to claim 4, wherein the black screen stage of the liquid crystal display apparatus comprises a touch panel detection period and all gate on of all of the gate driving signal period, wherein in the touch panel detection period, the first GAS signal is low electrical level signal, the second GAS signal is high electrical level signal; in the all gate on of all of the gate driving signal period, the first GAS signal is high electrical level signal, the second GAS signal is low electrical level signal.

9. A liquid crystal display apparatus comprising a GOA circuit according to claim 1.

* * * * *